United States Patent [19]
Furuno et al.

[11] 3,928,583
[45] Dec. 23, 1975

[54] METHOD FOR REDUCING SIDE EFFECTS OF AMINOGLYCOSIDE ANTIBIOTICS

[75] Inventors: Kouji Furuno; Hideki Nakano; Syuzo Matsubara; Akitoshi Shioya, all of Tokyo, Japan

[73] Assignee: Chugai Seiyaku Kabushiki Kaisha, Tokyo, Japan

[22] Filed: Aug. 7, 1974

[21] Appl. No.: 495,498

[30] Foreign Application Priority Data
Aug. 31, 1973 Japan.............................. 48-97344

[52] U.S. Cl.................................. 424/180; 424/279
[51] Int. Cl.² ....................... A01N 9/00; A01N 9/28
[58] Field of Search............................ 424/279, 180

[56] References Cited
OTHER PUBLICATIONS
Chemical Abstract 67:102793m (1967).
Physicians Desk Reference, 27 Ed., 1973, pp. 1256–1259.

*Primary Examiner*—Jerome D. Goldberg
*Assistant Examiner*—D. W. Robinson
*Attorney, Agent, or Firm*—Browdy and Neimark

[57] ABSTRACT

Side effects of an aminoglycoside antibiotic, renal toxicity and 8th nerve toxicity are reduced by using said aminoglycoside antibiotic in combination with 2,5-di-0-acetyl-D-glycosaccharo-1,4: 6,3-dilactone.

9 Claims, No Drawings

METHOD FOR REDUCING SIDE EFFECTS OF AMINOGLYCOSIDE ANTIBIOTICS

The present invention relates to a method for reducing the side effects of an aminoglycoside antibiotic when administered to mammals including human beings and poultry.

The term "aminoglycoside antibiotic" is a general term for an antibiotic having in its molecule deoxystreptamine structure to which amino sugar is bonded by glycoside bond. The antibiotic has so strong inhibitory effects on gram-positive and -negative bacteria, acid fast bacteria etc. that it is regarded as an important antibiotic in view of practical uses.

The antibiotics exhibit a broad anti-bacterial spectrum in vitro, can control the proliferation of various pathogenic bacteria even at a very low concentration and also exhibit an excellent prophylactic activity against experimental infection of various pathogenic bacteria in mice. The antibiotics, however, exhibit 8th nerve and renal toxicities and their application has been limited. Particularly renal toxicity is regarded as a serious problem and it is known according to statistical study of indexes indicating renal functions that renal functions become worse as the cumulative dose of the antibiotic, even Kanamycin A which has the lowest toxicity among this series of antibiotics, increases. Further, the antibiotic has never been administered to a patient having renal function disorder or to be given various plasma expanders, since serious or fatal disorder of renal function is often observed in such cases.

It is an object of the present invention to provide a method for reducing side effects of an aminoglycoside antibiotic when administered to mammals including human beings and poultry.

According to the present invention, side effects of an aminoglycoside antibiotic can be reduced by the administration of aminoglycoside antibiotic in combination with the oral administration of at least 50% by weight of 2,5-di-O-acetyl-D-gluco-sacchro-1,4: 6,3-dilactone based on the free form of said aminoglycoside antibiotic to mammals and poultry.

Aminoglycoside antibiotics used in the present invention include Streptomycin, Neomycin B and C, Kanamycin A, B and C, Ribostamycin, Paromomycin I and II, Gentamicin complex, Tobramycin, Butirosin A and B, Lividomycin A and B, 3',4'-dideoxykanamycin B, Sismomicin, 1-N-[(S)-4-amino-2-hydroxybutyryl]-3',4'-dideoxykanamycin B, 1-N-[(S)-4-amino-2-hydroxybutyryl]-3',4'-dideoxyneamine, 1-N-[(S)-4-amino-2-hydroxybutyryl]-kanamycin A, etc.

The aminoglycoside antibiotic may be either free base or mineral acid addition salt such as hydrochloric acid addition salt, sulfuric acid addition salt etc.

The lower limit of dose of 2,5-di-O-acetyl-D-glucosaccharo-1,4: 6,3-dilactone in view of side effects-reducing effect is 50% by weight based on the free form of an aminoglycoside antibiotic, while the upper limit is not critical because of the very low toxicity of 2,5-di-O-acetyl-D-glucosaccharo-1,4: 6,3-dilactone. In general it is preferable to use 100 – 1000% by weight of said compound based on the free form of an aminoglycoside antibiotic.

Generally aminoglycoside antibiotics are administered by intramuscular injection. In such cases appearance of renal toxicity is a problem. 2,5-di-O-acetyl-D-glucosaccharo-1,4: 6,3-dilactone is orally administered simultaneously with or just prior to the administration of an aminoglycoside antibiotic. Preferably the former compound is further administered every 6 hours after the initial administration, since the half-life of excretion of glucosaccharic acid into urine is 2 – 3 hours.

The method for reducing side effects of aminoglycoside antibiotic of the present invention can be applied to any animal which is to be administered with aminoglycoside antibiotics, for example, human beings, monkeys, horses, bovines, dogs, cats, chickens, pigs, sheep.

The following example illustrates the present invention but is not intended to limit the scope of the present invention.

EXAMPLE

The Wister-Imamichi strain male rats (weighing 250 – 300g) were used as test animals by dividing them into groups of 5 rats each.

After 48 hours of abstinence from water, each rat was orally administered with 300mg/kg of 2,5-di-O-acetyl-D-glucosaccharo-1,4: 6,3-dilactone, and 10 minutes after the administration, the rat was intramuscularly administered with an antibiotic as listed in the following table.

24 hours after the administration renal function disorder was observed. Physiological saline solution was used as control.

The results are shown in the following table:

| Antibiotics (dose) (weight of the free form (mg)/kg) | Group | Percentage of renal edema[1] (%) | Urea-nitrogen Content in blood[2] (mg/dl) | Occult blood in urine[3] |
|---|---|---|---|---|
| Kanamycin A (300) | administered | 0.70 | 25 | — |
| | control | 0.92 | 80 | +++ |
| Kanamycin B (200) | administered | 0.78 | 35 | + ~ ± |
| | control | 0.98 | 120 | +++ |
| Neomycin (75) | administered | 0.79 | 35 | + ~ ± |
| | control | 1.15 | 150 | +++ |
| Streptomycin (150) | administered | 0.71 | 27 | ± |
| | control | 0.81 | 60 | +++ |
| Ribostamycin (400) | administered | 0.73 | 25 | — |
| | control | 0.99 | 95 | +++ |
| Paromomycin (200) | administered | 0.75 | 30 | ± |
| | control | 1.06 | 150 | +++ |
| Gentamicin (50) | administered | 0.73 | 25 | — |
| | control | 0.82 | 60 | +++ |

[1](Renal weight/body weight) × 100 (%)
[2]Measured with the use of test papers for measuring urea-nitrogen content in blood manufactured by Ono Yakuhin.
[3]Measured with the use of test papers "Labstix" manufactured by Miles-Sankyo.

What is claimed is:

1. A method of reducing the renal toxicity and 8th nerve toxicity to mammals or poultry of aminoglycoside antibiotic comprising administering said aminoglycoside antibiotic in combination with the oral administration of 2,5-di-O-acetyl-D-glucosaccharo-1,4: 6,3-dilactone to said mammals or poultry for treating bacterial infection in an amount of 50–1000%- by weight based on the free form of said antibiotic.

2. The method of claim 1 wherein said aminoglycoside antibiotic is Streptomycin, Neomycin B and C, Kanamycin A, B and C, Ribostamycin, Paromomycin I and II, Gentamicin complex, Tobramycin, Butirosin A and B, Lividomycin A and B, 3′,4′-dideoxykanamycin B, Sismomicin, 1-N-[(S)-4-amino-2-hydroxybutyryl]-3′,4′-dideoxykanamycin B, 1*-N[(S)-4-amino-2-hydroxybutyryl]-3′,4′-dideoxyneamine, or 1-N-[(S)-4-amino-2-hydroxybutyryl]kanamycin A.

3. The method of claim 1 wherein said aminoglycoside antibiotic is a mineral acid addition salt of Streptomycin, Neomycin B and C, Kanamycin A, B and C, Ribostamycin, Paromomycin I and II, Gentamicin complex, Tobramycin, Butirosin A and B, Lividomycin A and B, 3′,4′-dideoxykanamycin B, Sismomicin, 1-N-[(S)-4-amino-2-hydroxybutyryl]-3′,4′-dideoxykanamycin B, 1-N-[(S)-4-amino-2-hydroxybutyryl]-3′,4′-dideoxyneamine, or 1-N-[(S)-4-amino-2-hydroxybutyryl]kanamycin A.

4. The method of claim 3 wherein said mineral acid addition salt is the sulfuric acid addition salt or hydrochloric acid addition salt.

5. The method of claim 1 wherein said mammal is a human being.

6. The method of claim 1 wherein said mammals and poultry are monkeys, horses, bovines, dogs, cats, chickens, pigs or sheep.

7. The method of claim 1 wherein said 2,5-di-O-acetyl-D-glucosaccharo-1,4: 6,3-dilactone is used in an amount of 100 – 1000% by weight based on the free form of the aminoglycoside antibiotic.

8. The method of claim 1 characterized in that, every six hours after initially administering 2,5-di-O-acetyl-D-glucosaccharo-1,4: 6,3-dilactone in an amount of about 50% by weight based on the free form of the aminoglycoside antibiotic simultaneously with or prior to the administration of the aminoglycoside antibiotic, the same dosage of 2,5-di-O-acetyl-D-glucosaccharo-1,4: 6,3-dilactone is further administered.

9. The method of claim 1, wherein said aminoglycoside antibiotic is gentamicin.

* * * * *